US010621596B2

(12) United States Patent
Fernando et al.

(10) Patent No.: US 10,621,596 B2
(45) Date of Patent: Apr. 14, 2020

(54) VIDEO OPTIMIZER FOR DETERMINING RELATIONSHIPS BETWEEN EVENTS

(71) Applicant: Disney Enterprises, Inc., Burbank, CA (US)

(72) Inventors: Peter Fernando, Puyallup, WA (US); Michael Clements, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 219 days.

(21) Appl. No.: 13/836,268

(22) Filed: Mar. 15, 2013

(65) Prior Publication Data

US 2014/0280212 A1  Sep. 18, 2014

(51) Int. Cl.
*G06Q 30/02* (2012.01)

(52) U.S. Cl.
CPC .............................. *G06Q 30/0201* (2013.01)

(58) Field of Classification Search
CPC ......... G06F 17/30867; G06F 16/24578; G06F 16/93
USPC ...... 707/748, 749, 758; 715/205; 725/38, 86
See application file for complete search history.

(56) References Cited

U.S. PATENT DOCUMENTS

| 7,055,168 | B1 | 5/2006 | Errico |
| 7,614,064 | B2 | 11/2009 | Zigmond |
| 8,131,708 | B2 | 3/2012 | Lu |
| 8,176,191 | B2 | 5/2012 | Fischer |
| 8,341,101 | B1 * | 12/2012 | Treiser ................... G06Q 30/02 706/45 |
| 2007/0073585 | A1 | 3/2007 | Apple |
| 2008/0034276 | A1 * | 2/2008 | Ficco ............................ 715/201 |
| 2008/0077952 | A1 | 3/2008 | St. Jean |
| 2008/0092189 | A1 | 4/2008 | Baker |
| 2008/0104521 | A1 | 5/2008 | Dubinko |
| 2009/0012927 | A1 | 1/2009 | Brooks |
| 2009/0018922 | A1 | 1/2009 | Steelberg |
| 2009/0018996 | A1 | 1/2009 | Hunt |
| 2009/0158308 | A1 | 6/2009 | Weitzenfeld |
| 2009/0164132 | A1 | 6/2009 | Jung |
| 2009/0259927 | A1 | 10/2009 | Fisher |

(Continued)

OTHER PUBLICATIONS

"VideoSense—Towards Effective Online Video Advertising", Mei, et al., 2007 http://smartwork.googlecode.com/svn-history/r718/trunk/Phd/papers/Video/advertising/VideoSense.PDF 10 pgs.

(Continued)

*Primary Examiner* — Marcin R Filipczyk
(74) *Attorney, Agent, or Firm* — Farjami & Farjami LLP (57) ABSTRACT

There is provided a system and method for a video optimizer for determining relationships between events. The method comprises receiving a total number of events for a plurality of contents over a period of time, receiving a first number of events of a first content of the plurality of contents over the period of time, receiving a second number of events of the plurality of contents over the period of time, and determining a relationship between the first content and the second content based on the first number of events, the second number of events, and the total number of events. A second relationship may be determined by utilizing a first time of event by a user of the first content, a second time of event by the user of the second content, and a weighed correspondence.

18 Claims, 5 Drawing Sheets

(56) References Cited

U.S. PATENT DOCUMENTS

| | | |
|---|---|---|
| 2010/0174671 A1 | 7/2010 | Brooks |
| 2011/0217022 A1 | 9/2011 | Miller |
| 2011/0247042 A1* | 10/2011 | Mallinson .......... G06K 9/00758 |
| | | 725/86 |
| 2011/0270674 A1 | 11/2011 | Cosman |
| 2012/0004982 A1 | 1/2012 | Cohee |
| 2012/0116872 A1* | 5/2012 | Hicken ............. G06Q 30/0251 |
| | | 705/14.49 |
| 2012/0158492 A1 | 6/2012 | Ye |
| 2012/0159329 A1 | 6/2012 | Chow |

OTHER PUBLICATIONS

"Comparing subjective video quality testing methodologies", Pinson, et al., 2003 http://www.multimedia.edu.pl/mmLab/MultimediaPL/txt/BT500_tests.pdf 10 pgs.

"Crowdsourced Automatic Zoom and Scroll for Video Retargeting", Carlier, et al., 2010 http://www.comp.nus.edu.sg/~ooiwt/papers/acmmm10-retarget.pdf 10 pgs.

* cited by examiner

VIDEO OPTIMIZER FOR DETERMINING RELATIONSHIPS BETWEEN EVENTS

BACKGROUND

In the past, advertisement campaigns directed to media content have been designed based on theories of what people want to watch and at what times people are most likely to view content. While some aspects of these theories have been helpful, it is difficult to see and analyze what media content drives viewers to other media content. For example, it is difficult to tell whether a commercial, teaser, trailer, or other short media content clip actually drives traffic to a show or movie, and whether that same content may possibly drive traffic to other shows or movies. Thus, media networks may not appropriately adjust their advertising and content placement in a manner that is most advantageous for media presentation purposes.

Viewers consume media content in a variety of formats now. Viewers may view content through televisions connected to some form of media transmission, such as cable, satellite, and/or radio networks. Such media devices may include beacons that transmit data including viewed media content and times of viewing. Additionally, online media content consumption has become increasingly popular. Server logs allow for reporting of similar information concerning media content, such as webpage visits. Such information is helpful to determine if content is outdated or disliked, but alone does not tell the network broadcasters if certain media content is more effective in providing proper advertisement to a program. Moreover, the information does not readily lend itself to a determination of what media content drives viewers to other media content.

SUMMARY

The present disclosure is directed to a video optimizer for determining relationships between events, substantially as shown in and/or described in connection with at least one of the figures, as set forth more completely in the claims.

DETAILED DESCRIPTION

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
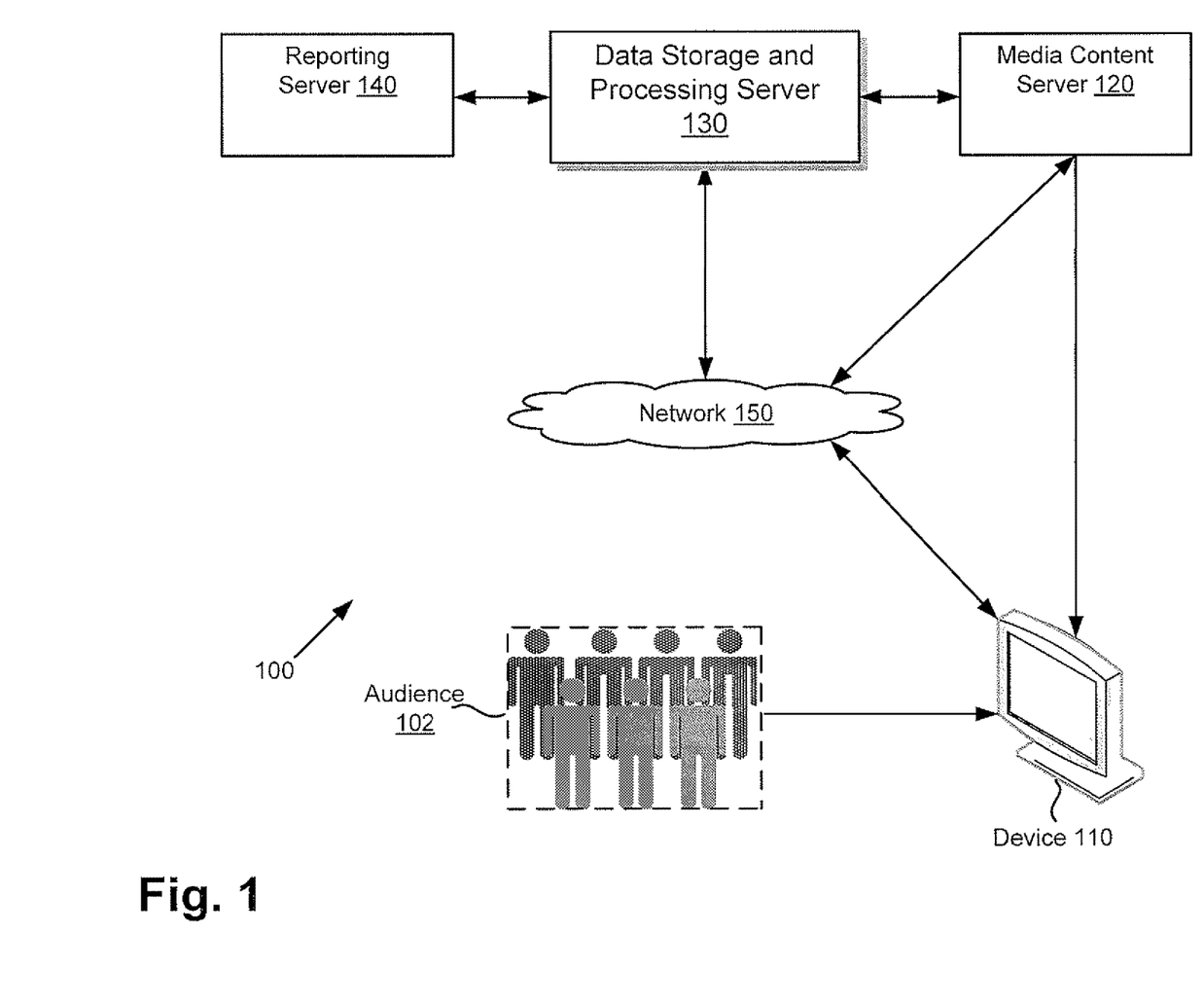
FIG. 1 presents an exemplary diagram of a system for determining relationships between events.

FIG. 1 presents an exemplary diagram of a system for determining relationships between events. As shown in FIG. 1, system environment 100 includes audience 102 viewing device 110. Device 110 receives media content, such as television programming, movies, web pages, interactive games, or other media content, from media content provider 120 directly and/or over network 150. Further, device 110 is connected to data storage and processing server 130 and reporting server 140 over network 150. Network 150 may correspond to a network connection, such as a broadband network, wireless phone service communication network, or other network capable of sending of receiving data. Although in the implementation of FIG. 1, device 110 is shown as a television, device 110 may be any suitable user device, such as a mobile phone, a personal computer (PC) or other home computer, a mobile phone, a personal digital assistant (PDA), or a gaming console, for example According to the implementation of FIG. 1, media content provider 120 may provide media content to device 110. Media content provider 120 may provide media content directly to device 110, such as a linear program stream or channel, for example. As shown in FIG. 1, media content provider 120 may utilize network 150 to provide media content to device 110, or may otherwise provide content to device 110, such as through provision of media content via cable or satellite television, or radio airwaves, for example. Media content provider 120 may be a media content provider such as a television or radio network, providing media content, such as an audio-visual, video, or audio stream, for example. More generally, as more media content becomes available, media content provider 120 may be any producer of media content, such as a user generated content provider or new source provider, for example.

A plurality of persons may make up audience 102, who may consume media content provided by media content provider 120 through device 110. For example, audience 102 may view a television program provided by media content provider 120 through a television. In another implementation, audience 102 may use a computer to view a movie or television program, view a webpage dedicated to a specific programming, or play a related interactive game. Thus, audience 102 may engage in some event corresponding to the viewed media content. An event may correspond to some user action taken with respect to a viewed media content.

Based on the viewed media content, audience 102 may create event data corresponding to the viewed media content and a time of viewing. The event data may be included in server logs stored on media content provider 120, such as server logs corresponding to a member of audience 102. Device 110 may also contain a beacon that transmits data corresponding to the viewed media content and the time of viewing to a server. The server receiving the beaconing data may be data storage and processing server 130, a web based analytic server, such as Adobe Omniture, or may be media content provider 120.

Data storage and processing server 130 of FIG. 1 is connected to device 110, media content provider 120, and reporting server 140 over network 150. Data storage and processing server 130 may correspond to a server for uploading, storing, and processing event data obtained from device 110 and/or media content provider 120. Data storage and processing server 130 may also be directly connected to media content provider 120 as shown in FIG. 1. As will be explained in further detail in reference to FIGS. 2, 3, and 4, data storage and processing server 130 may contain data storage and processing units capable of determining relationships between events. For example, data storage and processing server 130 may store and process event data corresponding to viewed media content by audience 102 and determine relationships between the viewed media content, such as whether the viewed media content drives traffic to other media content. While data storage and processing server 130 is shown as one server, it is understood that data storage and processing server 130 may correspond to one server or a plurality of servers.

Further shown in FIG. 1 is reporting server 140. Reporting server 140 is connected to media content provider 120, and data storage and processing server 130 over network 150. Reporting server 140 may correspond to a server for storage and reporting of relationships between events. For example, reporting server 140 may include a memory and a processor for outputting a report detailing relationships between events. The relationships can help determine if certain media drives audience 102 to other media. Thus, the relationships may be used to determine an advertisement strategy or campaign, the efficiency or success of certain types of advertising, program scheduling, and desirable placement of media content. While reporting server 140 is shown as one server, it is understood that reporting server 140 may correspond to one server or a plurality of servers.

Although in the implementation of FIG. 1, media content provider 120, data storage and processing server 130, and reporting server 140, are shown to exist as distinct network entities, it is understood that two or more of media content provider 120, data storage and processing server 130, and reporting server 140 may be included in a single network entity, such as media content provider 120. As previously discussed, network 250 may correspond to a network connection, such as a broadband network, wireless phone service communication network, or other network capable of sending of receiving data.

Figure 2:
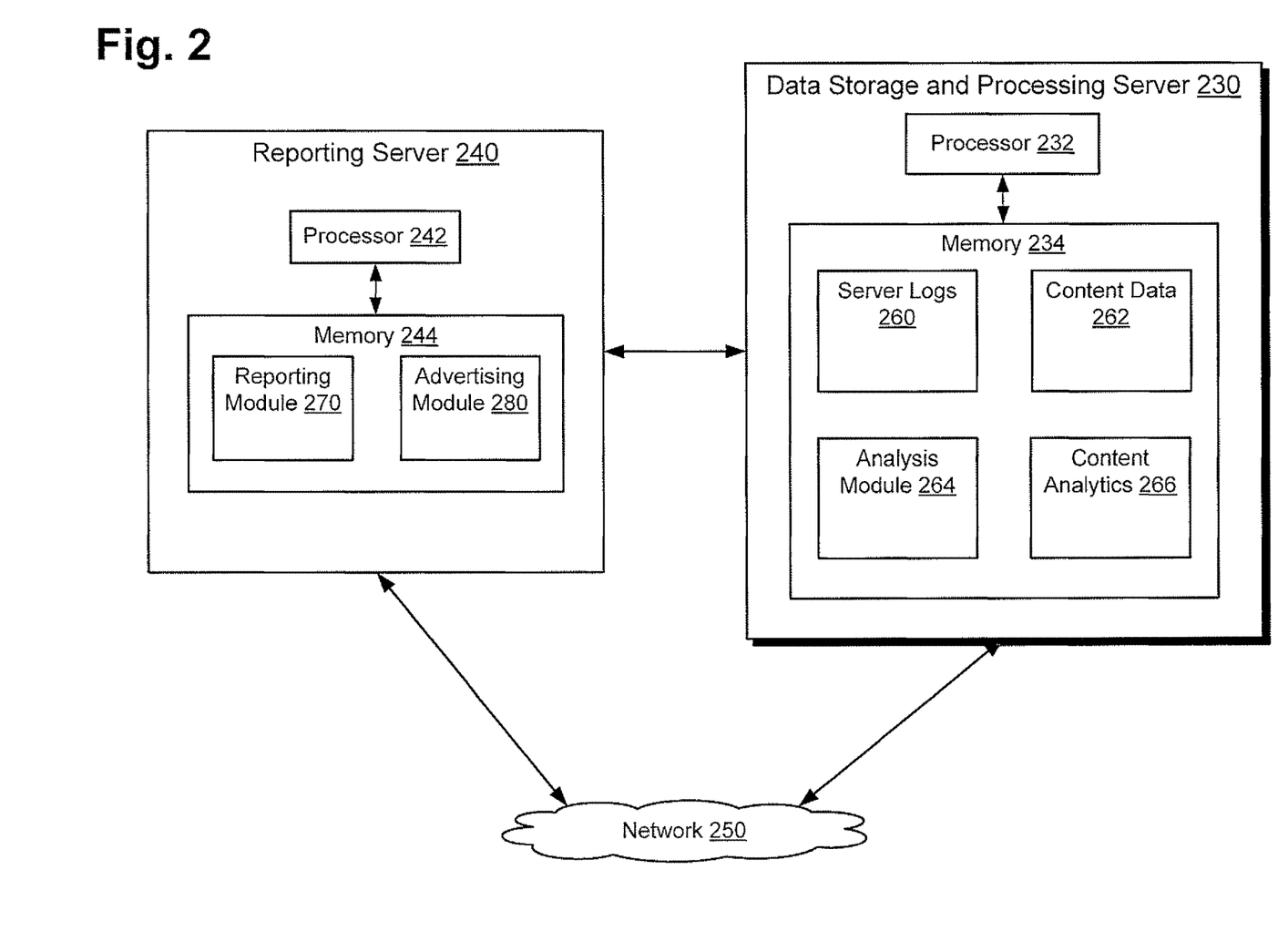
FIG. 2 shows a more detailed example of servers for determining relationships between events.

FIG. 2 shows a more detailed example of servers for determining relationships between events. FIG. 2 shows data storage and processing server 230 and reporting server 240 connected to network 250 and in communication with each other. Data storage and processing server 230 is shown with processor 232 and memory 234 including server logs 260, content data 262, analysis module 264, and content analytics 266a. Also shown is reporting server 240 containing processor 242 and memory 244 including content analytics 266b, reporting module 270, and advertising module 280.

Data storage and processing server 230 is shown accessible over network 250. As previously discussed, data storage and processing server 230 may correspond to a server for uploading, storing, and processing data obtained from a device and/or media content provider. Data storage and processing server 230 is shown including processor 232 and memory 234. Memory 234 is shown with server logs 260, content data 262, analysis module 264, and content analytics 266a.

Processor 232 of data storage and processing server 230 is configured to access memory 234 to store received input and/or to execute commands, processes, or programs stored in memory 234. For example, processor 232 may receive data corresponding to media content and store the information in memory 234. Memory 234 is shown with server logs 260 and content data 262. Processor 232 may also access memory 234 and execute programs, processes, and modules stored in memory 234, such as analysis module 264. Additionally, processor 232 may store in memory 234 data resulting from executed programs, processes and modules, such as content analytics 266a. Processor 232 may correspond to a processing device, such as a microprocessor or similar hardware processing device, or a plurality of hardware devices. However, in other implementations, processor 232 refers to a general processor capable of performing the functions required by data storage and processing server 230. For example, processor 232 may correspond to a plurality of processors used in a massive parallel processing unit, such as Apache Hadoop software framework, including Apache Hive and Apache Pig.

Memory 234 of data storage and processing server 230 corresponds to a sufficient memory capable of storing commands, processes, and programs for execution by processor 232. Memory 234 may be instituted as ROM, RAM, flash memory, or any sufficient memory capable of storing a set of commands. In other implementations, memory 234 may correspond to a plurality memory types or modules. Thus, processor 232 and memory 234 contains sufficient memory and processing units necessary for data storage and analysis server 230. Although memory 234 is shown as located on data storage and analysis server 230, in other implementations, memory 234 may be separate but connectable to data storage and analysis server 230.

FIG. 2 further includes reporting server 240 accessible over network 250 and in direct connection with data storage and processing server 230. As previously discussed, reporting server 240 may correspond to a server for storage and reporting of relationships between events. Reporting server 240 includes processor 242 and memory 244 with content analytics 266b, reporting module 270, and advertising module 280 stored in memory 244. Processor 242 of reporting server 240 is configured to access memory 244 to store received input and/or to execute commands, processes, or programs stored in memory 244. Thus, processor 242 may receive data corresponding to events and store the information in memory 244. For example, processor 242 may receive content analytics 266a from data storage and processing server 230 and store as content analytics 266b in memory 234. Content analytics 266a and content analytics 266b may refer to iterations of the same data. However, in other implementations, content analytics 266a and content analytics 266b may contain other or different data. Processor 242 may also access memory 234 and execute programs, processes, and modules stored in memory 234, such as reporting module 270 and advertising module 280. Additionally, processor 242 may store in memory 244 data resulting from executed programs, processes and modules.

Processor 242 may correspond to a processing device, such as a microprocessor or similar hardware processing device, or a plurality of hardware devices. However, in other implementations, processor 242 refers to a general processor capable of performing the functions required by reporting server 240. Memory 244 of reporting server 240 corresponds to a sufficient memory capable of storing commands, processes, and programs for execution by processor 232. Memory 244 may be instituted as ROM, RAM, flash memory, or any sufficient memory capable of storing a set of commands. In other implementations, memory 244 may correspond to a plurality memory types or modules. Thus, processor 242 and memory 244 contains sufficient memory and processing units to a necessary for reporting server 240. Although memory 244 is shown as located on reporting server 240, in other implementations, memory 244 may be separate but connectable to reporting server 240.

Data storage and processing server 230 may receive event data over network 250, or as previously discussed, directly from a media content provider. Such event data may correspond to server logs 260 and content data 262 and may provide information concerning events corresponding to viewed media content. For example, server logs 260 and content data 262 may contain event data determining a total amount of views a plurality of media contents has received, a total amount of views each of the plurality of media contents has received, an identification of a user viewing each of the plurality of media contents, a time of viewing each of the plurality of media contents by the user, webpage views, interactive game and/or social media analytics, and/or other event data.

Data storage and processing server 230 may implement analysis module 264 using server logs 260 and content data 262. As will be explained in more detail with respect to FIGS. 3 and 4, analysis module may utilize server logs 260 and content data 262 to determine relationships between events. Thus, analysis module may provide content analytics 266a containing information relating to events. Content analytics 266a may then be stored in memory 234 or transmitted to reporting server 240.

Reporting server 240 is in communication with data storage and processing server 230 directly and/or over network 250. Reporting server 240 may receive data from data storage and processing server 230, such as content analytics 266a and store them as content analytics 266b. As previously discussed content analytics 266b may correspond to an iteration of the same data as content analytics 266a or may contain different information. Reporting server 240 may then utilize content analytics 266b with reporting module 270 to report content analytics 266b for viewing. For example, reporting module 270 may output comparisons, visuals, or other reporting tools corresponding to reporting module 270. Additionally, reporting server 240 may utilize content analytics 266b with advertising module 280. Advertising module 280 may be utilized to determine an advertising strategy, change advertisement placement, remove or add advertisements, or otherwise change an advertising campaign based on content analytics 266b.

Figure 3:
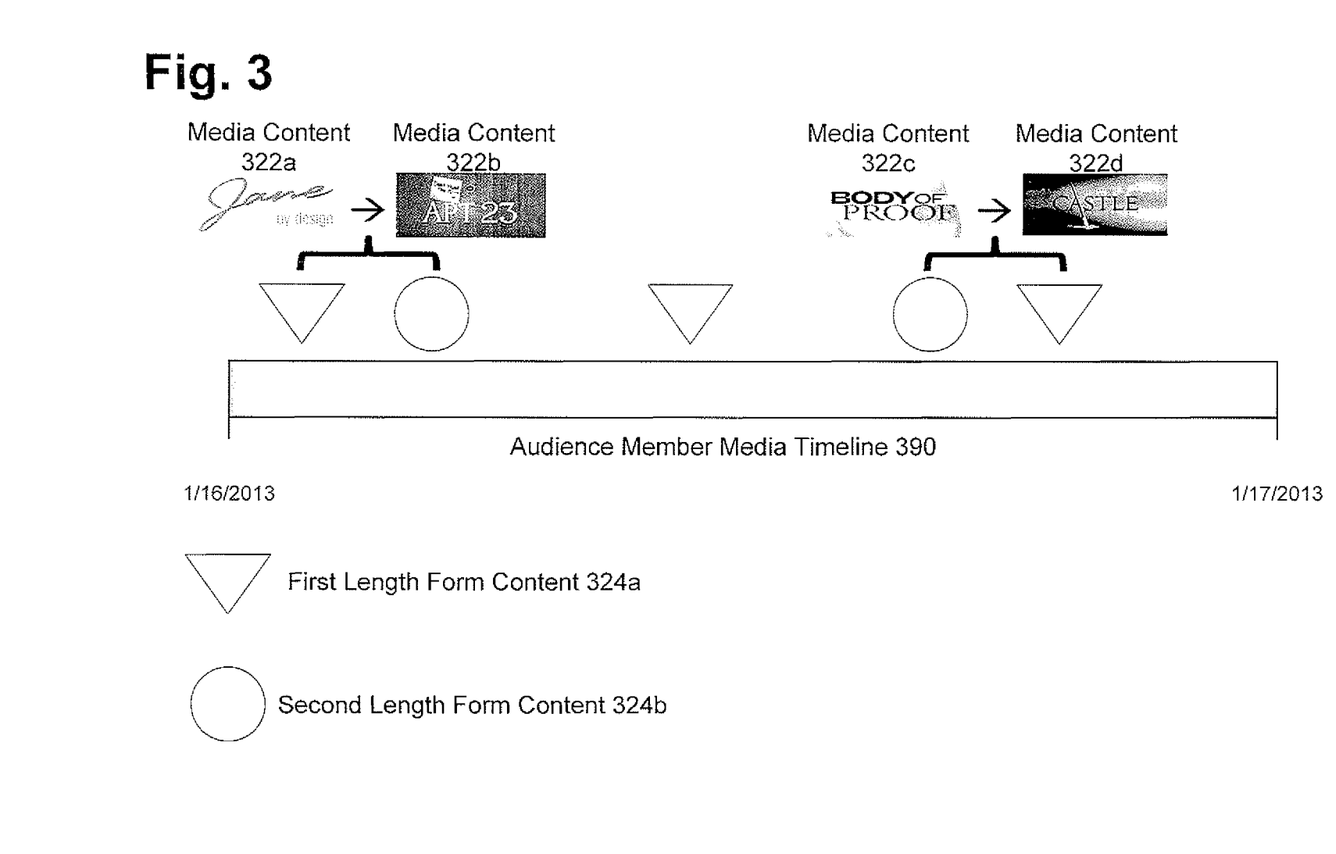
FIG. 3 shows an audience member media timeline by a user for use in determining relationships between events.

Moving to FIG. 3, FIG. 3 shows an audience member media timeline by a user for use in determining relationships between events. FIG. 3 contains audience member media timeline 390 displaying times of viewing media content 322a, media content 322b, media content 322c, and media content 322d during a one day time period by a user. However, in other implementations, shorter and longer time periods may be used. It is noted that the time period chosen should meaningfully connect a plurality of events to realize a correlation, such as viewing one event and marking calendar for later viewing of a corresponding event, or otherwise connecting the events. Thus, different time periods may be used in order to determine relationships between events.

As shown in FIG. 3, the triangle marks on audience member media timeline 390 correspond to first length form content 324a and circle marks on audience member media timeline 390 correspond to second length form content 324b. However, in other implementations, other user actions related to viewed media content may be utilized to determine relationships between events. For example, as previously discussed, events may correspond to webpage views, interactive games, social media analytics, and/or other event data.

According to FIG. 3, a member of an audience may view media content during a specific time period, displayed as a one day time period. However, longer or shorter time periods may be reported for the audience member's viewing history. Audience member media timeline 390 shows media content 322a viewed first, media content 322b viewed second, media content 322c viewed third, and media content 322d viewed fourth. Each media content 322a-d corresponds to a media content form, such as first length form content 324a and second length form content 324b. First length form content 324a may correspond to advertisement, trailer, short media content episode such as a webisode or teaser, or other short form media content. Second length form content 324b may correspond to a longer form media content then first length form content 324a, such as a television episode, movie, or other media content. In other implementations, both first length form content 324a and second length form content 324b may correspond to other media content, such as audio content, user generated content, or other available content. Additionally, as previously discussed, other events may be chosen for analysis on audience member media timeline 390.

Audience member media timeline 390 shows an audience members viewed media content history. A different audience member media timeline 390 may be created for each individual audience member utilizing parallel processing or more conventional sequential processing. As shown in FIG. 3, the audience member views media content 322a and then views media content 322b. The audience member may view other content sporadically in the day, but then again watches media content 322c followed shortly by media content 322d. Based on these viewing habits, specific inferences may be made to determine whether viewed media content drives traffic to other media content.

During a one-day period, the total events corresponding to all media content 322a-d may be tabulated across an entire audience range. Additional media content and/or events may be added if desired. Additionally, total views of each of media content 322a-d may be calculated. Using these totals, the percentage number of events corresponding to each of media content per the total number of events corresponding to all of the plurality of media content may be determined.

Using Bayesian probability, if the likelihood of an event corresponding to each of media content 322a-d together in the same time period is unrelated, then it would be expected that the likelihood of all events occurring would be the product of their percentages. For example, if media content 322a corresponds to 10% of daily viewership, and media content 322b corresponds to 5% of daily viewership, then the audience member is 0.5% likely to watch media content 322a and media content 322b in the same time period.

However, utilizing server logs and content data, it can be determined the actual occurrence of events corresponding to media contents 322a-d. Using the example of FIG. 3, it is assumed that if the actual number of views of media content 322a and 322b differ from the product of their occurring percentages, there is a correlation between media content 322a and media content 322b. For example, if the actual number of audience members viewing media content 322a and media content 322b in a day is 1%, then it can be assumed that they are more likely to occur together and there is a positive relationship between media content 322a and media content 322b. However, in another example, if media content 322a and media 322b is viewed by audience members only 0.2% of the time in the same time period, there is a negative relationship between media content 322a and media content 322b.

Additionally, using audience member media timeline 390, a weighted correspondence may be determined and applied to the number of events corresponding to media content 322a and media content 322b in the time period of audience member media timeline 390. The weighted correspondence may be a predetermined variable based on the time between an event corresponding to media content 322a and an event corresponding to media content 322b on audience member media timeline 390. For example, in FIG. 3, events corresponding to media content 322a and media content 322b occur near the same time, while events corresponding to media content 322c and media content 322d occur much later, but near each other in time. Based on these times, a weighted correspondence may be applied to events corresponding to media content 322a and media content 322b occurring together, and events corresponding to media content 322c and media content 322d occurring together. However, a different weighted correspondence may be applied to events corresponding to media content 322a and media content 322d occurring in the same day, such as by depreciating the statistical value of media content 322a and media content 322d.

Figure 4:
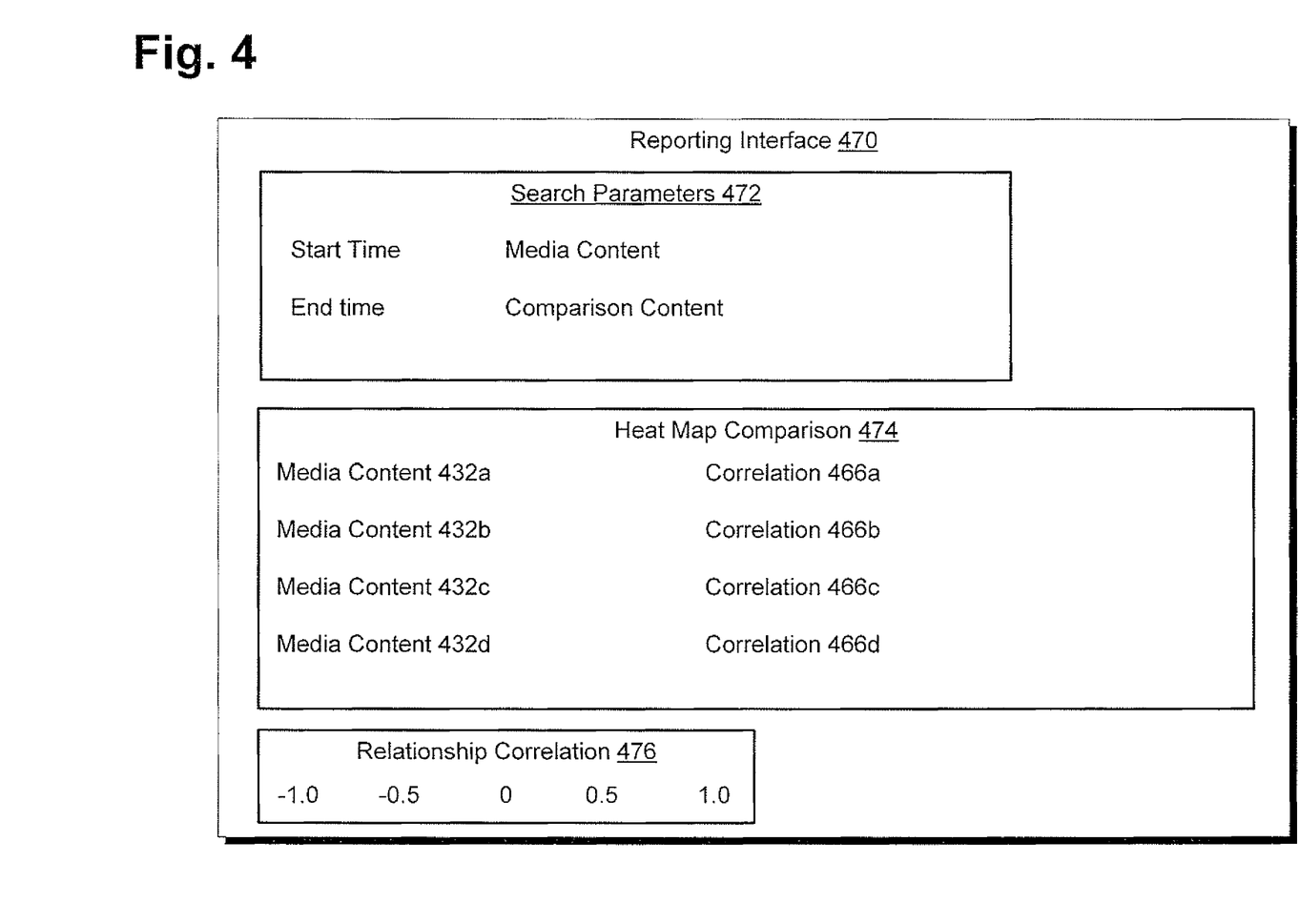
FIG. 4 shows a reporting interface for viewing relationships between events.

Moving to FIG. 4, FIG. 4 shows a reporting interface for viewing relationships between events. FIG. 4 shows reporting interface 470 having search parameters 472, heat map comparison 474, and relationship correlation 476. Shown in heat map comparison 474 is media content 432a, media content 432b, media content 432c, and media content 432d. Also shown in result heat map comparison 474 is correlation 466a, correlation 466b, correlation 466c, and correlation 466d. Reporting interface 470 may be output for display to a user of a system for determining relationships between events.

Reporting interface 470 of FIG. 4 contains search parameters 472. Search parameters 472 may correspond to configurable input by a user of reporting interface 470. As shown in FIG. 4, search parameters 472 include a start time, end time, media content and comparison content. However, in different implementations more or different options may be utilized in search parameters 472 as desired. Thus, the user of reporting interface 470 may enter information corresponding to the media content and/or events they wish to compare for a designated time period.

After the user enters the media content, time period, and comparison content, heat map comparison 474 may return outputs in each of media contents 432a-d and correlations 466a-d. For example, if a specific media content, such as an episode of a television show, is entered into search parameters 472, and media contents 432a-d are entered as comparison content in search parameters 472, then heat map comparison 474 may display media contents 432a-d and correlations 466a-d. As previously discussed, different events may also be used as the search parameters. Correlations 466a-d may be determined as discussed above with respect to FIG. 3. Thus, if the expected relationship for correlation 466a is 0.5%, and the actual relationship for correlation 466a is determined to be 1%, the correlation 466a will show the positive relationship and possible color-coding to identify the positive relationship.

Additionally, correlations 466a-d may be standardized using each correlation and a weighted correspondence. Thus, correlations 466a-d may be given a numerical value, such as a value on a −1 to 1 scale. As shown in relationship correlation 476, a standardization scale is shown determining the strength of the correlation. Thus, a −1 correlation value in correlations 466a-d may determine the entered media content in search parameters 472 and media contents 432a-d are strongly negatively correlated. In contrast, a +1 correlation value in correlations 466a-d may determine the entered media content and media content 432a-d are strongly positively correlated.

Using reporting interface 470, the relationships may be output for viewing. A user of reporting interface 470 may view the relationships and determine the media contents that are correlated. Further, the user may utilize this information in order to adjust, remove, or create and advertising strategy, placement, or campaign. A module may further utilize reporting interface 470 and adjust placement of television shows, movies, and other content in a format that will drive traffic to strongly correlated media content. The module may also split up media content that is negatively correlated.

FIGS. 1, 2, 3, and 4 will now be further described by reference to FIG. 5, which presents flowchart 500 illustrating a method for use by a video optimizer for determining relationships between events. With respect to the method outlined in FIG. 5, it is noted that certain details and features have been left out of flowchart 500 in order not to obscure the discussion of the inventive features in the present application.

Figure 5:
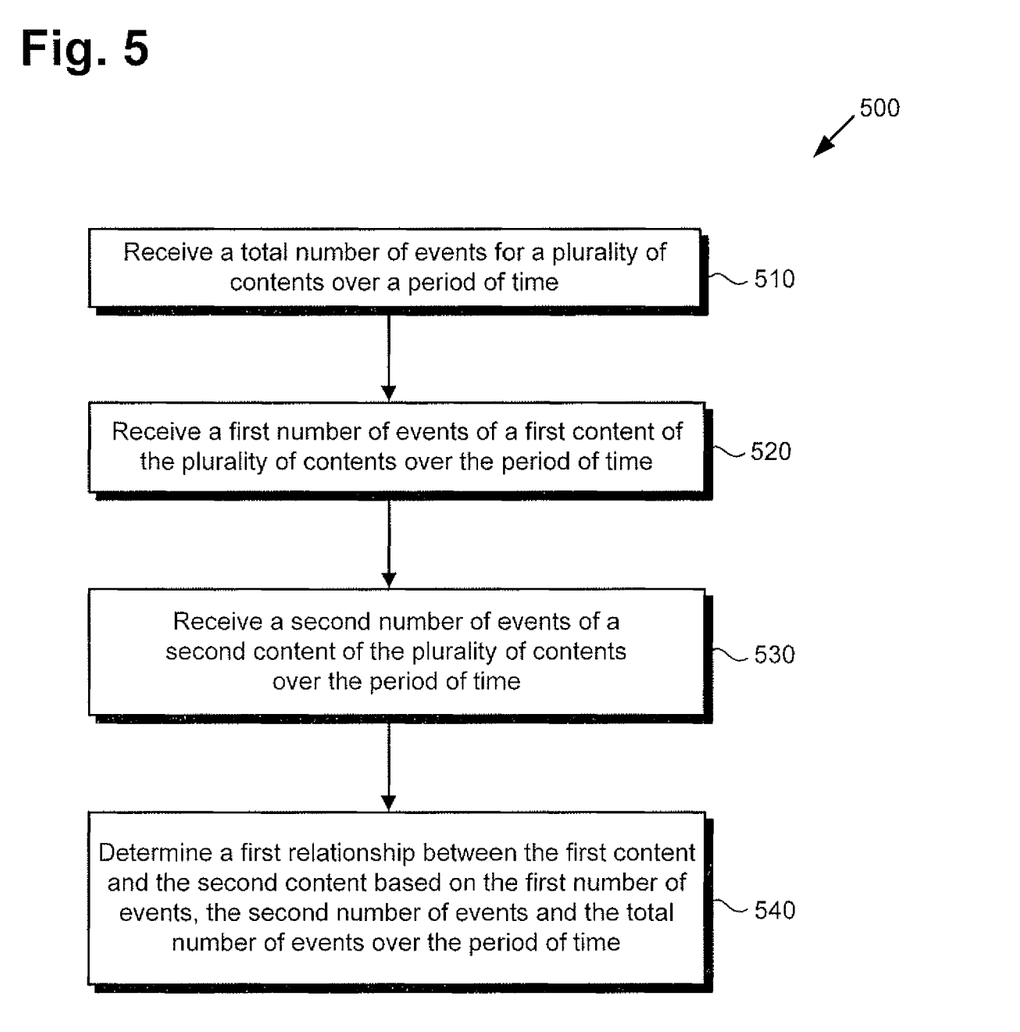
FIG. 5 presents an exemplary flowchart illustrating a method for use by a video optimizer for determining relationships between events.

Referring to FIG. 5 in combination with FIG. 1, FIG. 2, FIG. 3, and FIG. 4, flowchart 500 begins with receiving a total number of events for a plurality of contents 332a-d/432a-d over a period of time (510). The receiving may be performed by processor 232 of data storage and processing server 130/230. Processor 232 of data storage and processing server 130/230 may receive the total number of events for the plurality of contents over the period of time from server logs 260 and/or content data 262 of memory 234. Data storage and processing server 130/230 may obtain server logs 260 and/or content data 262 from device 110 over network 150/250. Additionally, data storage and processing server 130/230 may obtain server logs 260 and/or content data 262 from media content provider 120 directly and/or over network 150/250.

The total number of events of the plurality of contents may correspond to views of media contents 322a-d/432a-d and any additional media content included for a specific report. Thus, the total number of events may be contained within server logs 260 and/or content data 262. Additionally, the time period chosen for determining relationships between events may correspond to a one day time period, such as in the example of audience member media timeline 390. However, in other implementations, the time period may correspond to a different amount of time.

As previously noted, the duration of audience member media timeline 390 used to establish the correlation between any two events, is independent from the timeline chosen for determining relationships between events. The time period chosen for determining relationships between events is part of the mathematical analysis as previously discussed. However, the time period displayed in a reporting interface is chosen for viewing; the user selects the time range he is interested in viewing, for example a season opening day or week, or an entire season.

The method of flowchart 500 continues with receiving a first number of events of a first content 332a-d/432a-d of the plurality of contents 332a-d/432a-d over the period of time (520). The receiving may be performed by processor 232 of data storage and processing server 130/230. Processor 232 of data storage and processing server 130/230 may receive the first number of events of the first content of the plurality of contents over the period of time from server logs 260 and/or content data 262 of memory 234. The first number of the first content may correspond to one of media contents 332a-d/432a-d. Thus, the first number of events may be contained within server logs 260 and/or content data 262.

Flowchart 500 continues with receiving a second number of events of second content 332a-d/432a-d of the plurality of contents 332a-d/432a-d over the period of time (530). The receiving may be performed by processor 232 of data storage and processing server 130/230. Processor 232 of data storage and processing server 130/230 may receive the second number of events of the second content of the plurality of contents over the period of time from server logs 260 and/or content data 262 of memory 234. The second number of the second content may correspond to one of media contents 332*a-d*/432*a-d*. Thus, the second number of events may be contained within server logs 260 and/or content data 262.

The method of flowchart 500 continues with determining a first relationship between the first content and the second content based on the first number of events, the second number of events, and the total number of events over the period of time (540). The determining may be performed by processor 232 of data storage and processing server 130/230. Processor 232 may utilize analysis module 264 with server logs 260 and content data 262 stored in memory 234 of data storage and processing server 230 to perform the determining.

Using the above description, a relationship may be determined between viewed media content. Using the relationship and subsequent analysis can help media content distributors determine a plan of distribution of media. Further, the relationships can help guide an advertisement campaign by shown positive and negative correlations in a way that has not previously been considered.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor, and a memory, the method comprising:
   receiving a total number of events for a plurality of contents over a period of time, the total number of events corresponding to one or more actions taken during the period of time, with respect to the plurality of contents, by an audience member among a plurality of audience members of the plurality of contents, each of the plurality of contents including at least one of audio or visual content;
   receiving a first number of events of a first content of the plurality of contents over the period of time, the first number of events corresponding to one or more first actions taken by the audience member, the one or more first actions corresponding to the first content;
   receiving a second number of events of a second content of the plurality of contents over the period of time, the second number of events corresponding to one or more second actions taken by the audience member, the one or more second actions corresponding to the second content;
   receiving a first placement order of the plurality of contents;
   determining a first relationship between the first content and the second content based on a comparison of the first number of events, the second number of events, and the total number of events over the period of time with viewership of the first content and the second content by a plurality of other audience members;
   displaying, in response to a first user input, the first relationship including a positive correlation or a negative correlation between the first content and the second content based on the comparison;
   determining, in response to a second user input and based on the first relationship, a second placement order of the plurality of contents, the second placement order being different from the first placement order; and
   adjusting, based on the first relationship, the plurality of contents based on the second placement order of the plurality of contents;
   wherein determining the first relationship between the first content and the second content further includes receiving a first time corresponding to the first content, wherein the first time corresponds to the audience member, receiving a second time corresponding to the second content, wherein the second time corresponds to the audience member, applying a weight to the first relationship, wherein the weight is determined based on an amount of time elapsed between the first time and the second time.

2. The method of claim 1, wherein each of the first content and the second content is one of a first length form and a second length form, wherein the second length form is longer than the first length form.

3. The method of claim 2, wherein the first length form is one of an advertisement, a trailer, and a short media content episode.

4. The method of claim 2, wherein second length form is one of a television episode and a movie.

5. The method of claim 1, further comprising:
   determining a second relationship, in response to a second user input; and
   adjusting the second placement order of the plurality of contents based on the second relationship to create a third placement order of the plurality of contents.

6. The method of claim 5 further comprising:
   displaying the second relationship.

7. The method of claim 1, wherein the events are one of media views, webpage views, and interactive game plays.

8. The method of claim 1, wherein determining the first relationship between the first content and the second content is further based on a percentage of viewership of each of the plurality of events over the period of time.

9. A system comprising:
   a processor; and
   a memory storing an analysis module;
   the processor configured to execute the analysis module for:
      receiving a total number of events for a plurality of contents over a period of time, the total number of events corresponding to one or more actions taken during the period of time, with respect to the plurality of contents, by an audience member among a plurality of audience members of the plurality of contents, each of the plurality of contents including at least one of audio or visual content;
      receiving a first number of events of a first content of the plurality of contents over the period of time, the first number of events corresponding one or more first actions taken by the audience member, the one or more first actions corresponding to the first content;
      receiving a second number of events of a second content of the plurality of contents over the period of time, the second number of events corresponding to one or more second actions taken by the audience member, the one or more second actions corresponding to the second content;

receiving a first placement order of the plurality of contents;

determining a first relationship between the first content and the second content based on a comparison of the first number of events, the second number of events, and the total number of events over the period of time with viewership of the first content and the second content by a plurality of other audience members;

displaying, in response to a first user input, the first relationship including a positive correlation or a negative correlation between the first content and the second content based on the comparison;

determining, in response to a second user input and based on the first relationship, a second placement order of the plurality of contents, the second placement order differing from the first placement order; and adjusting, based on the first relationship, the plurality of contents based on the second placement order of the plurality of contents;

wherein determining the first relationship between the first content and the second content further includes receiving a first time corresponding to the first content, wherein the first time corresponds to the audience member, receiving a second time corresponding to the second content, wherein the second time corresponds to the audience member, applying a weight to the first relationship, wherein the weight is determined based on an amount of time elapsed between the first time and the second time.

10. The system of claim 9, wherein each of the first content and the second content is one of a first length form and a second length form, wherein the second length form is longer than the first length form.

11. The system of claim 10, wherein the first length form is one of an advertisement, a trailer, and a short media content episode.

12. The system of claim 10, wherein the second length form is one of a television episode and a movie.

13. The system of claim 9, further comprising:
determining a second relationship, in response to a second user input; and
adjusting the second placement order of the plurality of contents based on the second relationship to create a third placement order of the plurality of contents.

14. The system of claim 13 wherein the server is further configured to:
transmit the second relationship to a reporting server for viewing.

15. The system of claim 9, wherein the events are one of media views, webpage views, and interactive game plays.

16. The system of claim 9, wherein determining the first relationship between the first content and the second content is further based on a percentage of viewership of each of the plurality of events over the period of time.

17. A method for use by a system including a processor, and a memory, the method comprising:
receiving a total number of views of a plurality of contents by an audience member of the plurality of contents over a period of time, each of the plurality of contents including at least one of audio or visual content;
receiving a first number of views of a first content of the plurality of contents by the audience member over the period of time;
receiving a second number of views of a second content of the plurality of contents by the audience member over the period of time;
receiving a first placement order of the plurality of contents;
displaying, in response to a first user input, a first relationship between the first content and the second content based on a comparison of the first number of views, the second number of views, and the total number of views over the period of time with viewership of the first content and the second content by a plurality of other audience members, wherein displaying the first relationship includes displaying a positive correlation or a negative correlation between the first content and the second content based on the comparison;
determining, in response to a second user input and based on the first relationship, a second placement order of the plurality of contents, the second placement order being different from the first placement order; and
adjusting, based on the first relationship, the plurality of contents based on the second placement order of the plurality of contents;
wherein determining the first relationship between the first content and the second content further includes receiving a first time corresponding to the first content, wherein the first time corresponds to the audience member, receiving a second time corresponding to the second content, wherein the second time corresponds to the audience member, applying a weight to the first relationship, wherein the weight is determined based on an amount of time elapsed between the first time and the second time.

18. The method of claim 17, wherein determining the first relationship between the first content and the second content is further based on a percentage of viewership of each of the plurality of events over the period of time.

* * * * *